US006222932B1

United States Patent
Rao et al.

(10) Patent No.: US 6,222,932 B1
(45) Date of Patent: *Apr. 24, 2001

(54) AUTOMATIC ADJUSTMENT OF IMAGE WATERMARK STRENGTH BASED ON COMPUTED IMAGE TEXTURE

(75) Inventors: Ravishankar Rao, White Plains; Frederick Cole Mintzer, Shrub Oak, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,847

(22) Filed: Nov. 26, 1997

Related U.S. Application Data

(60) Provisional application No. 60/051,096, filed on Jun. 27, 1997.

(51) Int. Cl.[7] .............................. G06K 9/00; G09C 3/00; H04L 9/00
(52) U.S. Cl. ............................. 382/100; 380/54; 713/176
(58) Field of Search .................................... 382/135, 137, 382/138, 100, 250, 280; 283/113; 162/110; 380/4, 51, 54; 713/176; 705/57

(56) References Cited

U.S. PATENT DOCUMENTS

| | | | |
|---|---|---|---|
| 5,530,759 | * 6/1996 | Braudaway et al. | 382/137 |
| 5,568,570 | * 10/1996 | Rabbani | 382/238 |
| 5,602,760 | * 2/1997 | Chacon et al. | 364/516 |
| 5,848,155 | * 12/1998 | Cox | 380/34 |
| 5,862,260 | * 1/1999 | Rhoads | 382/232 |
| 5,915,027 | * 6/1999 | Cox et al. | 380/54 |
| 6,049,627 | * 4/2000 | Becker et al. | 382/181 |

OTHER PUBLICATIONS

Watermarking Digital Images for Copyright Protection, Boland et al; IEEE Conference on Image Processing and its Application, ISBN: 0–85296–642–3, pp. 326–330, Jul. 1995.*

Secure Spread Spectrum Watermarking for Multimedia, Cox et al; IEEE Transaction on Image Processing, ISSN: 1057–7149, vol. 6, pp. 1673–1687, Dec. 1997.*

* cited by examiner

*Primary Examiner*—Andrew W. Johns
*Assistant Examiner*—Mehrdad Dastouri
(74) *Attorney, Agent, or Firm*—David M. Shofi, Esq.; F. Chau & Associates, LLP

(57) ABSTRACT

A system and method of automatically adjusts watermark strength of a watermarked image based on the content of the image. The described system includes a process by which the correct watermark strength is estimated with a model of preferred watermark strength based upon human perception as measured with a test group. Preferred watermark strength of a watermark within a watermarked reference image is determined and parameter constants associated with measured image texture values for the reference image are then determined. Image texture values are measured for a particular image to be watermarked, and these determined parameter constants are used to predict the strength of the watermark for the particular image. Images are watermarked by modifying the luminance of those pixels that fall within a mask specifying the watermark design. In this way, the chromaticity of the pixel remains constant but the luminance changes. The amount by which the luminance is changed is dependent on the desired strength of the watermark: a stronger watermark demands a larger change in the luminance.

17 Claims, 5 Drawing Sheets

AUTOMATIC ADJUSTMENT OF IMAGE WATERMARK STRENGTH BASED ON COMPUTED IMAGE TEXTURE

This application claims the benefit of U.S. Provisional Application 60/051,096 filed Jun. 27, 1997.

FIELD OF THE INVENTION

The invention relates to the field of digital imaging and more particularly to the fields of multimedia object security and image watermarking.

BACKGROUND OF THE INVENTION

Currently, digital capture of object images such as paintings and manuscripts, storage and retrieval of the images, and management of rights to the images is of growing importance with respect to information transfer and distribution, such as that of the Internet. Image watermarking has become an important and widely used technique to identify ownership and protect copyrights to images. An image watermark immediately identifies the owner of an image, and if properly constructed, can deter subsequent unscrupulous use of the image. Image watermarking is also used by stock photography vendors such a Photodisc, and others such as Digimarc.

There are two types of image watermarks in common use: Visible image watermarks, such as the ones used by the Vatican Library and Lutherhalle collection, and invisible watermarks. The insertion of a visible watermark should satisfy two conflicting conditions: the watermark should be strong enough to be perceptible, yet it should be light enough to be unobtrusive and not mar the beauty of the original image. Though an invisible watermark is not perceptible, its strength can also be adjusted or selected. Typically such an adjustment or selection is made manually for both visible and invisible watermarks, and human intervention is required to adjust the strength of the watermark to the right level. This manual adjustment is satisfactory if only a few images are to be watermarked, but is unsuitable for a large collection of images. Thus, it is desirable to have a technique to automatically adjust or select the strength of the watermark based on the texture of each image. This will allow a large number of images to be automatically watermarked, thus increasing the throughput of the watermarking stage.

Visible watermarking is well known in the art and may be summarized as follows. Visible image watermarking alters pixel brightness of selected pixels of the image corresponding to pixels of the watermark mask, which is typically done in the following manner. A visible image watermarking processor receives two images: the image of the watermark to be applied, such as the company logo, and the image to be protected. The watermark image may be binary, with a logic "0" representing background and a "1" representing foreground of the watermark. Only the pixels in the image to be watermarked corresponding to the pixels of the foreground of the watermark image are changed in brightness. Alternatively, the watermark image can be ternary, with "0" representing no change in brightness, "1" representing an increase in brightness and "2" representing a decrease in brightness, and then a processor alters the brightness of selected pixels as dictated by the image of the watermark. In general, the watermark image can possess a multiplicity of gray levels. Further details about using watermark images with multiple gray levels may be found in U.S. Pat. No. 5,530,759 awarded to Braudaway et al., entitled "Color Correct Digital Watermarking of Images", incorporated herein by reference.

The brightness of each pixel is altered by reducing or increasing it by a perceptually uniform amount, which is pre-determined by the user. In order to further define this process, XYZ is defined as a color space and L*a*b* as a uniformly perceptible color space. The XYZ color space was established by the Commission International de l'Eclairage (CIE), a body of scientists and illumination engineers, and this space is well known in the art. The XYZ color space is a standardized representation for color which takes into account the human eye's response to light. The XYZ values, also known as tristimulus values, represent the amounts of three primaries (chosen by the CIE) needed to match a given color. All visible colors can be described by some additive combination of X, Y and Z. Further discussion of the XYZ details may be found in Wyszecki and Stiles, Color Science, New York, Wiley 1967, which is incorporated herein by reference.

Red, Green and Blue color values, or RGB values, may be transformed to the XYZ values, or CIE tristimulus values, by using equation (1).

$$\begin{bmatrix} X \\ Y \\ Z \end{bmatrix} = M_s \begin{bmatrix} R \\ G \\ B \end{bmatrix} \tag{1}$$

In equation (1), $M_s$ is a 3×3 scanner matrix which provides a linear mapping between RGB values and XYZ values.

A uniform color space is one in which colors that appear equally different from each other are represented by equidistant points. However, neither the RGB color space nor the XYZ color spaces is a uniform color space. Modified color spaces, which are uniform color spaces L*a*b*, have been proposed, such as a color space based on luminance and chrominance values, or L*u*v* uniform color space. Given the RGB values (R, G, B) for a pixel, the RGB values are transformed into a perceptually uniform color space L*a*b* as follows.

Let $X_w$, $Y_w$ and $Z_w$ be the XYZ coordinates of the reference white point of an image. Then X, Y and Z can be transformed into L*a*b* values using equations (2), (3) and (4), and these methods are known in the art and described in, for example, Wyszecki, G. et al., Color Science, John Wiley, 1982.

$$L^* = \begin{cases} 116(Y/Y_w)^{(1/3)} - 16 & \text{if } (Y/Y_w) \geq 0.008856 \\ 903.3(Y/Y_w) & \text{otherwise} \end{cases} \tag{2}$$

$$a^* = 500(X/X_w)^{(1/3)} - (Y/Y_w)^{(1/3)} \tag{3}$$

$$b^* = 200(Y/Y_w)^{(1/3)} - (Z/Z_w)^{(1/3)} \tag{4}$$

The component related to image watermarking is L*, which approximates perceptually uniform brightness. Suppose the user determines ΔL* to be the perceptually uniform amount by which the brightness is changed in order to impose a watermark image value to the brightness value of a pixel. A higher value of ΔL* corresponds to a stronger impression of the watermark on the original image. Given ΔL*, new RGB values of (R,G,B) for the pixel using the color transformation are calculated using equations (5) and (6), which are described in, for example, Braudaway, Magerlein and Mintzer, "Protecting publicly-available images with a visible image watermark," in Proceedings, SPIE Conference on Optical Security and Counterfeit Deterrence Techniques, vol. SPIE 2659, pp.126–132, February, 1996. First the new brightness $\tilde{Y}$ is calculated from the current brightness Y using equation (5):

$$\tilde{Y} = \begin{cases} Y + \dfrac{Y_\omega}{38.667}\left(\dfrac{Y}{Y_\omega}\right)^{2/3} \Delta L^* & \text{if } (Y/Y_\omega) \geq 0.008856 \\ Y + \dfrac{Y_\omega}{903.3}\Delta L^* & \text{otherwise} \end{cases} \quad (5)$$

From equation (5), larger values of $\Delta L^*$ result in larger changes to the brightness Y, which may make a visible watermark more obtrusive.

The other tristimulus components, $\tilde{X}$ and $\tilde{Z}$, are obtained by scaling the values by the ratio of $\tilde{Y}/Y$. With the new tristimulus components, $\tilde{X}\tilde{Y}\tilde{Z}$, the new tristimulus values may be transformed to RGB color space values using the inverse of equation (1), given below as equation (6):

$$\begin{bmatrix} R \\ G \\ B \end{bmatrix} = M_s^{-1} \begin{bmatrix} X \\ Y \\ Z \end{bmatrix} \quad (6)$$

where $M_s^{-1}$ is the inverse of matrix $M_s$.

New values of (R,G,B) do not change the chromaticity of the pixel, which maintains the color the pixel while changing its brightness. To thwart attempts to remove the watermark, the change in brightness, or-strength, for the pixel, $\Delta L^*$, may be varied randomly such that the mean $\Delta L^*$ value equals the value selected by the user.

Techniques for invisible image watermarking are also available, and some typical techniques known in the art are as follows. One method employs modification of the least significant bits of the image to embed the watermark. A more robust method of applying an invisible watermark which survives transformations such as resealing and compression employs computation of a two dimensional discrete cosine transform of the image (2D DCT) and then identification of n coefficients of highest magnitude excluding the DC coefficient (n is an arbitrary number). The watermark is then embedded into these n coefficients, for example, by adding to each coefficient the corresponding water mark strength. The inverse 2D DCT is then taken to obtain the watermarked image. If the DCT coefficients are not significantly altered, the watermark will not be perceptible in the inverse transform. However, the more the DCT coefficients are altered, the easier it becomes to detect the presence of the watermark in the final image. Thus there is a tradeoff here between the invisibility of the watermark and its detectability.

SUMMARY OF THE INVENTION

An apparatus and method determines a watermark strength of a watermarked image, the watermarked image formed from an image and an image watermark, the strength level corresponding to a reference watermark strength of a reference image having a set of parameters associated with a measured texture value of the reference image. The apparatus and method measure a texture value of at least a portion of the image; and calculate the watermark strength based on the measured texture value and the set of parameters.

BRIEF DESCRIPTION OF THE DRAWINGS

These and other features and advantages of the present invention will become apparent from the following detailed description, taken in conjunction with the accompanying drawings, wherein:

FIG. 5A illustrates an energy mask suitable for use with the local energy texture measurement process of an exemplary embodiment of the present invention;

FIG. 5B illustrates an energy mask suitable for use with the local energy texture measurement process of an exemplary embodiment of the present invention;

FIG. 5C illustrates an energy mask suitable for use with the local energy texture measurement process of an exemplary embodiment of the present invention; and FIG. 5D illustrates an energy mask suitable for use with the local energy texture measurement process of an exemplary embodiment of the present invention.

DETAILED DESCRIPTION

Overview

Figure 1:
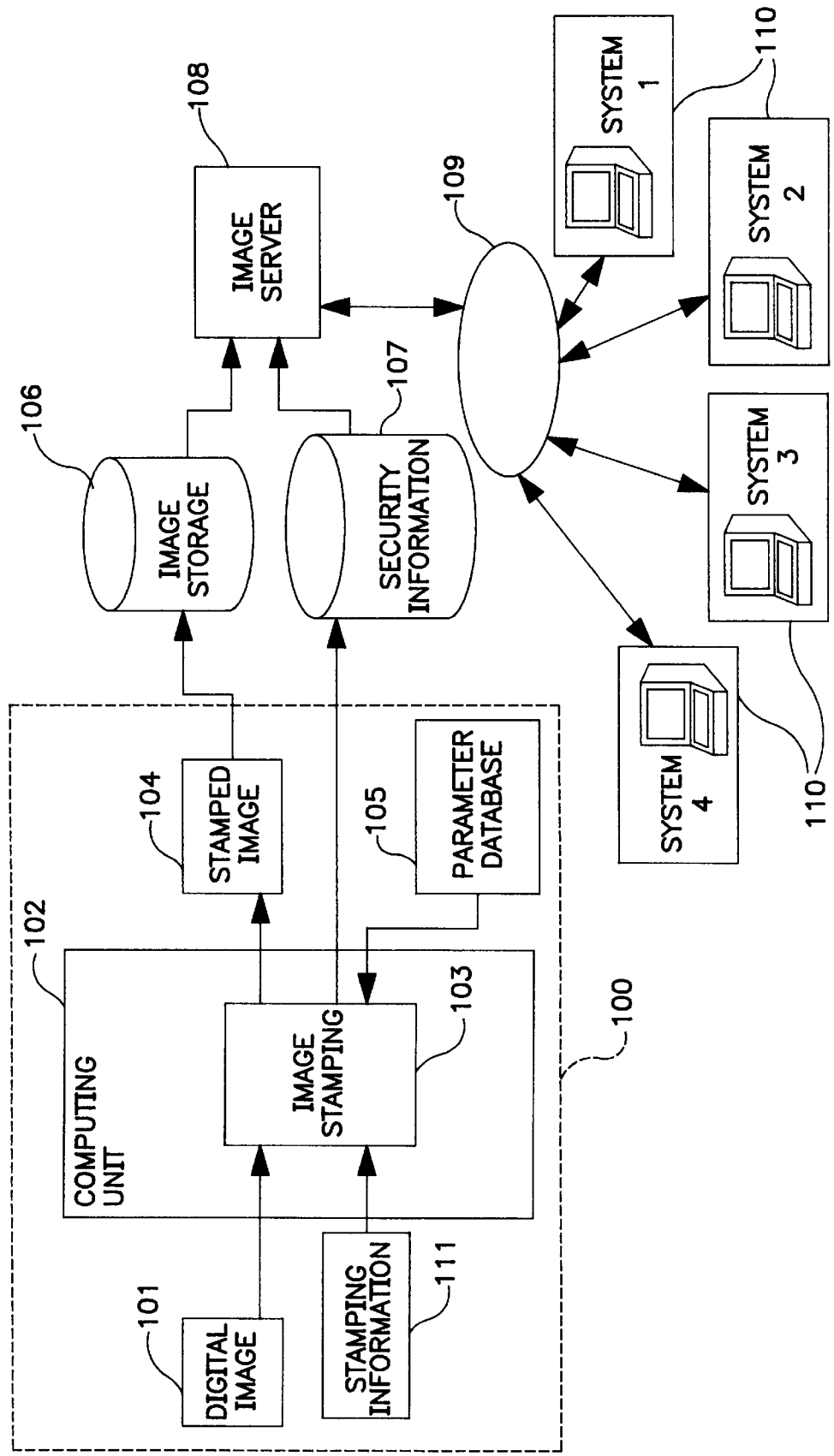
FIG. 1 is a block diagram of an automatic image watermarking system in accordance with an exemplary embodiment of the present invention as employed in an image information provider network.

FIG. 1 is a block diagram of an automatic image watermarking system 100 in accordance with an exemplary embodiment of the present invention as employed in an image information provider network. As shown, automatic image watermarking system 100 provides an strength watermarked image, shown as a stamped image 104, and system 100 includes a digital image database 101 having a selection of images, a stamping information database 111 having a selection of watermark images, a computing unit 102 including image stamping processor 103, and a parameter database 105.

Stamped image 104 may be employed in an information distribution network which allows user systems 110 to access stamped images available from an image server 108 through an electronic medium 109, such as the Internet. Each stamped image 104 is typically stored in a stamped image database 106 for retrieval by a image server 108. In cases where the stamped image 104 is encrypted, or where an invisible watermark is used which requires a verification key, image server 108 may access optional security information database 107 for necessary information.

Digital image database 101 stores a selection of images which are to be "stamped" with an image watermark. For purposes of the following discussion, the term "image stamping" refers to the process of applying an image watermark, such as a company logo, to an image. The image may be stored, for example, as a digitized representation of pixels from a scanned image. These pixels may further be represented as Red, Green and Blue (R,G,B) values or as luminance and chrominance values. The stamping information database 111 stores a selection of watermark images which are used to stamp the image. The computing unit 102 performs various database functions such as image and image watermark retrieval for signal processing functions for the system 100, Computing unit 102 also includes image stamping processor 103 which receives both the image and the watermark image and performs the processing functions necessary to apply the image watermark to the image. A parameter database 105 for determining the appropriate strength of the watermark to be applied to the image is described below.

Figure 2:
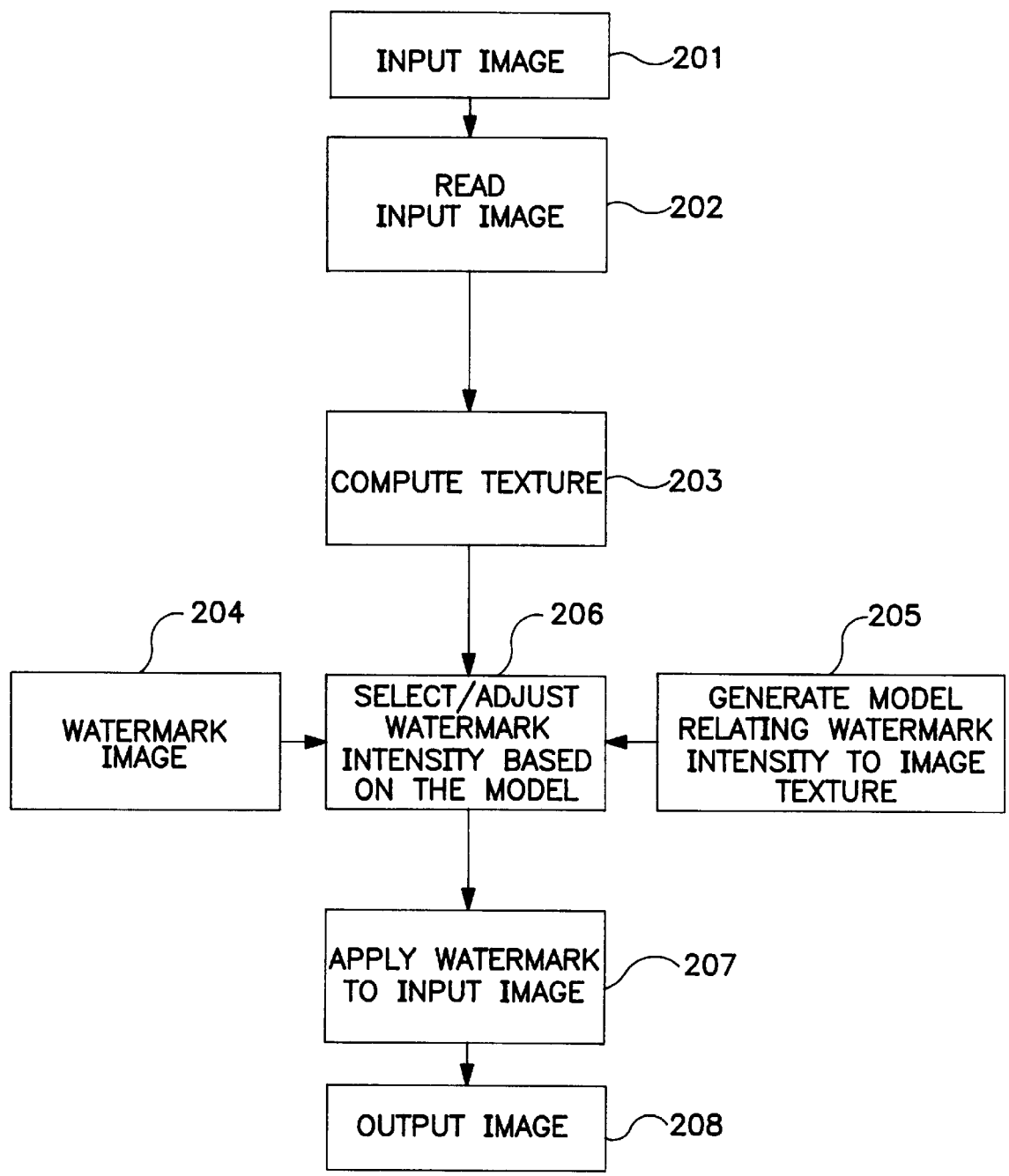
FIG. 2 is a block diagram showing the functional blocks of an exemplary embodiment of a watermarking and strength adjustment process of the automatic image watermarking system of FIG. 1.

FIG. 2 is a block diagram showing the functional blocks of an exemplary embodiment of a watermarking and strength-adjustment process of the automatic image watermarking system of FIG. 1. First, at step 201, the input image to be watermarked is selected. In accordance with the exemplary embodiment of the present invention, the input image may be automatically selected as part of a sequence of images to be stamped. Next, at step 202, the pixel values associated with the selected image are read into a processor, such as computing unit 102 which provides the values to image stamping processor 103 (FIG. 1).

At step 203 the processor computes texture values for the image. While the computation of texture values is described below, briefly, this process calculates a texture value associated with a corresponding portion, or several portions, of the image. The portion(s) may be matrices of pixel values of the image, and the texture value may represent a measure of a base strength of the portion, or of other characteristics of the image content of the portion. Next, a watermark image is selected at step 204, and then parameters associated with a model for watermark strength which use the texture values are retrieved at step 205.

Using the texture values computed for the image in step 203, the watermark values retrieved at step 204, and the model parameters determined at step 205, the process at step 206 calculates the strength of the watermark to be applied, adjusts the watermark strength, $\Delta L^*$, applied to each pixel of the image.

Once the strength for the watermark applied to the image is determined, at step 207 the processor applies the watermark to the image on, for example, a pixel by pixel basis, to provide a watermarked image. At step 208, the watermarked image is provided to an external storage unit for access by users. Since the watermarking process may be accomplished using tristimulus components as defined in equations (2), (3) and (4) already described, once the watermark strength, $\Delta L^*$, is applied to the tristimulus values, equation (5) is used to combine the watermark strength, $\Delta L^*$, with the pixel strength, and then converted to RGB values using equation (6).

Image Texture Measurement

Before describing the operation of each step of FIG. 2, the measurement of image "texture" is described. Image texture refers to the surface markings or two dimensional appearance of a surface within an image. Image texture may be derived by combining three primitive texture types: (1) strongly ordered textures, such as repetitive patterns (e.g. brick walls); (2) weakly ordered textures, such as surfaces having a random appearance (e.g sand grains); and (3) oriented textures, such as surfaces that have directionality (e.g. wood grain). Measuring texture and providing texture values is well known and is described, for example, in A. R. Rao, A Taxonomy for Texture Description and Identification, Springer Verlag, 1990, and in H. Wechsler, "Texture Analysis: A survey," Signal Processing, vol. 2. pp. 271–282, 1980, and which are incorporated herein by reference.

Measures for image texture typically may be (1) texture features such as energy, homogeneity and entropy based on a co-occurrence matrix, described in K. Haralick, K. Shanmugam and I. Dinstein, "Textural features for image classification," IEEE Trans. Systems, Man and Cybernetics, vol. SMC-3 No. 6, pp 610–621, November, 1973, and incorporated herein by reference; and (2) measures of local image energy based on energy masks which measure spectral energy content in various bands, described in K. I. Laws, Textured Image Segmentation. PhD. Thesis, Dept. of Electrical Engineering, Univ. Southern California, 1980, and incorporated herein by reference.

Every digital image is comprised of a finite number of strength levels, known as gray levels. For instance, a pixel of a black and white image may be represented by an 8-bit binary word, and each 8-bit binary word may represent up to 256 possible gray levels. For color images, where the pixel is represented by three values (R,G,B), the measured texture value may be computed in either of the red, green, or blue color channels, or may be a combination of the channels using a weighted average, such as (R+G+B)/3.

One method measures a texture value related to the co-occurrence matrix for a neighborhood of an input image. A relative frequency with which two image pixels separated by a distance ($\Delta x$, $\Delta y$) occur in the given neighborhood, one with grey level strength i and the other with strength j where i and j are integers, is defined as the element (i,j) of the two dimensional co-occurrence matrix, P (i, j, |$\Delta x$, $\Delta y$). The two dimensional co-occurrence matrix, P (i, j, |$\Delta x$, $\Delta y$), defines the probability of going from gray level strength i to gray level strength j along the vector ($\Delta x$, $\Delta y$). Considering an M×N neighborhood of an image containing L gray levels ranging from 0 to (L–1), f (m,n) is defined as an image strength at row m and column n. The co-occurrence matrix may then be defined, for example, as in equation (7):

$$P(i, j | \Delta x, \Delta y) = \sum_{n=1}^{N-\Delta y} \sum_{m=1}^{M-\Delta \omega} A \quad (7)$$

where $$A = \begin{cases} \frac{1}{(M-\Delta x)(N-\Delta y)} & \text{if } f(m, n) = i, \text{ and } f(m + \Delta x, n + \Delta y) = j \\ 0 & \text{otherwise} \end{cases}$$

Thus the coccurrence matrix, P (I,j|$\Delta x$, $\Delta y$) is an L×L matrix. Based on this matrix, several texture measures can be defined. Some of the more common exemplary measures are given as follows in equations (8), (9), (10) and (11). The texture measure value of inertia, I, may be defined as in equation (8):

$$I = \sum_{i=0}^{i=L-1} \sum_{j=0}^{j=L-1} (i-j)^2 P(i, j | \Delta x, \Delta y). \quad (8)$$

The texture measure value local homogeneity, G, may be defined as in equation (9):

$$G = \sum_{i=0}^{i=L-1} \sum_{j=0}^{j=L-1} \frac{1}{1 + (i-j)^2} P(i, j | \Delta x, \Delta y). \quad (9)$$

The texture measure value energy, E, may be defined as in equation (10):

$$E = \sum_{i=0}^{i=L-1} \sum_{j=0}^{j=L-1} (P(i,j|\Delta x, \Delta y))^2. \quad (10)$$

The texture measure value entropy, H, may be defined as in equation (11):

$$H = \sum_{i=0}^{i=L-1} \sum_{j=0}^{j=L-1} -P(i,j|\Delta x, \Delta y) \text{Log}(P(i,j|\Delta x, \Delta y)). \quad (11)$$

In another method, texture values which are measures of local image energy based on energy masks measure spectral energy content in various bands, and the measure of spectral content may be useful for texture discrimination. The texture energy within a portion of an image is calculated by convolving the image portion with a selected one of these masks and computing well known statistics as texture values, such as the sum of the squared values of the resulting image convolved with the mask. FIGS. 5A through 5D illustrate energy masks suitable for use with the local energy texture measurement process of an exemplary embodiment of the present invention.

Although the previous discussion described particular texture measures, the present invention is not limited to these embodiments, which are exemplary only. Other methods for measuring texture parameters, such as the local orientation field, fractal dimension and analysis of repetition, for example, may also be used.

Watermarking an Image and Adjusting Visual Watermark Strength

Figure 3:
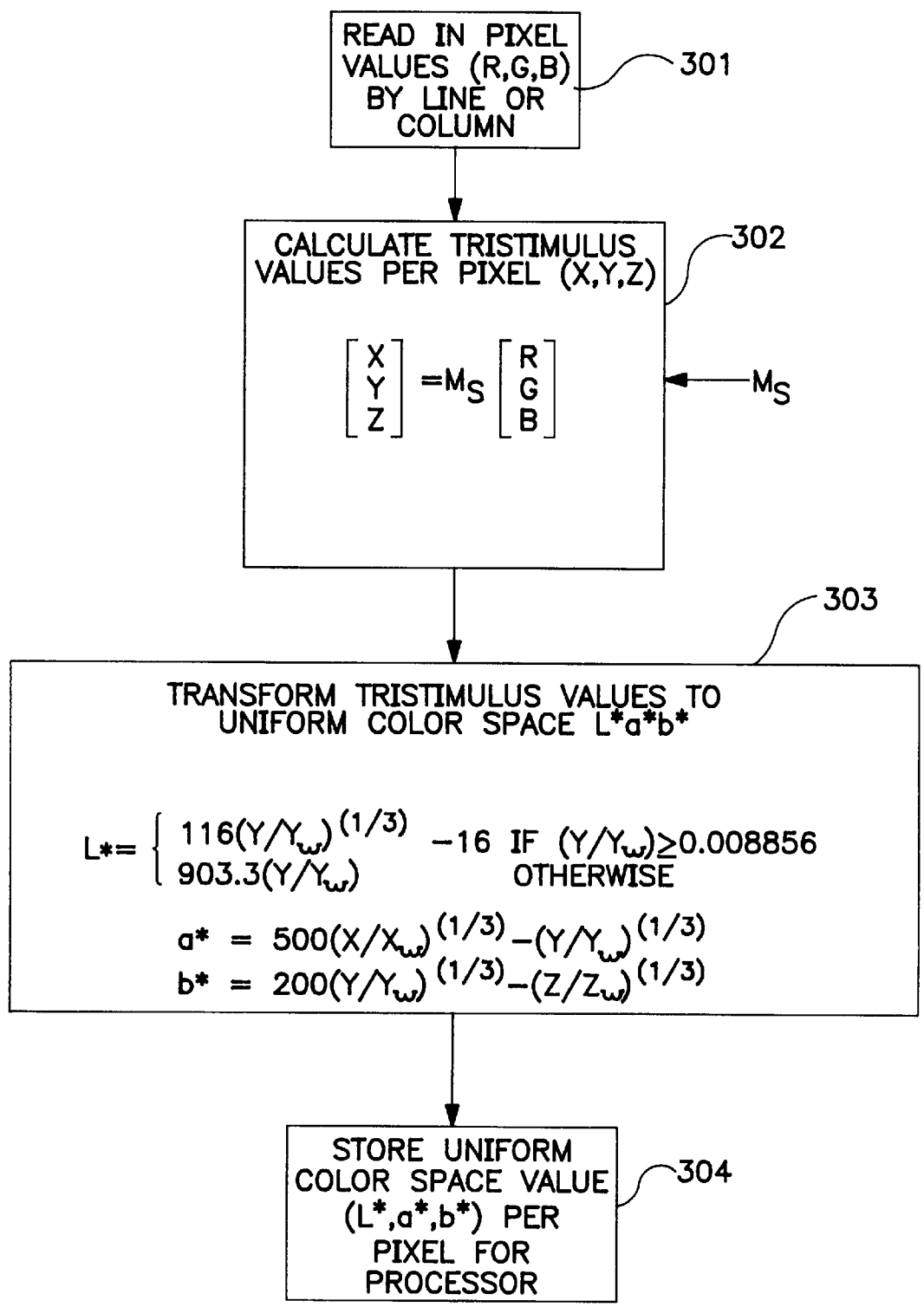
FIG. 3 is a block diagram illustrating a calculation of pixel brightness or strength value suitable for use with an exemplary embodiment of the present invention.

Returning to FIG. 2, at step 202 the input image is read, and at this step the pixel values of the image may be in a form that requires a conversion to a uniform color space. For example, the pixel values of the image may be in an RGB color space, requiring a transformation of RGB values into a perceptually uniform color space L*a*b*. FIG. 3 is a block diagram illustrating a calculation of current pixel brightness or strength value suitable for use with an exemplary embodiment of the present invention.

First, at step 301, each line, or column, of pixels for the image is read into the processor, each pixel may be represented by an (R,G,B) value, with each of the R, G and B channels represented by, typically, an eight or sixteen bit value. Next, at step 302, the scanning matrix $M_s$ is received and is used to linearly map the received pixels from the (R,G,B) value to an (X,Y,Z) value. Next, at step 303, the (X,Y,Z) value is transformed to the uniformly perceptible color space as L*a*b* values, as described previously with respect to equations 2, 3 and 4. Then, at step 304, the L*a*b* values are stored for future use by the processor.

Figure 4:
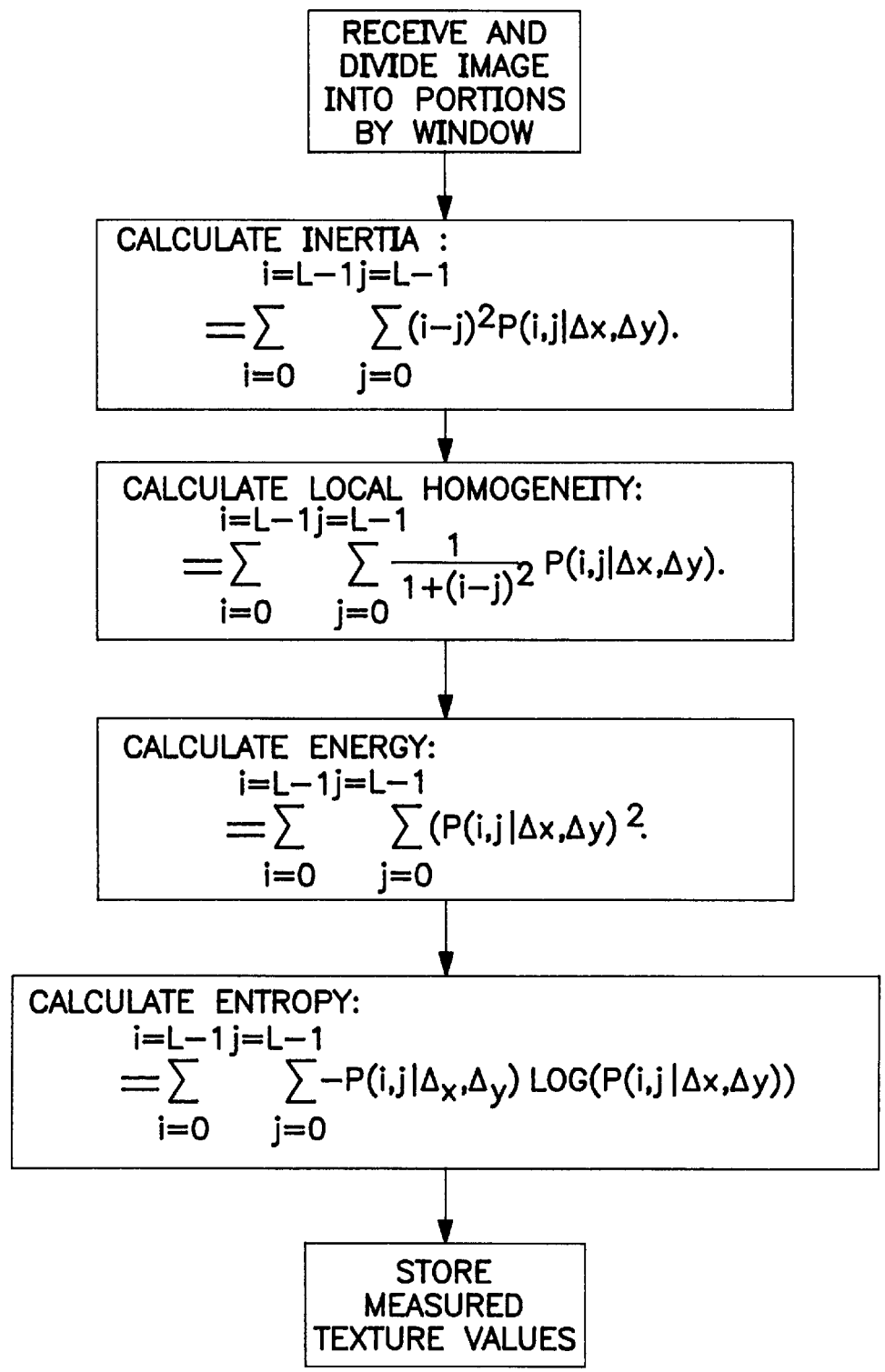
FIG. 4 is a block diagram illustrating a calculation of texture values with a co-occurance matrix suitable for use with the texture measurement process of an exemplary embodiment of the present invention.

At step 203 of FIG. 2, the processor may compute texture values based on texture features such as energy, homogeneity and entropy based on the co-occurrence matrix. However, the present invention is not so limited, and this description is by way of example only to facilitate an understanding of the present invention. FIG. 4 is a block diagram illustrating a calculation of texture values with a co-occurrence matrix suitable for use with the texture measurement process of an exemplary embodiment of the present invention. As shown, at step 401, the processor receives each pixel having new values corresponding to the uniformly perceptible color space, and then the processor divides the image into portions based upon the window selected. Next, at steps 402, 403, 404 and 405, the values for inertia, local homogeneity, energy and entropy, respectively, are calculated for each portion. Finally, at step 406, these measured values are stored for subsequent use by the image stamping processor to adjust the watermark strength.

Next, the process of creating a model for the generation of appropriate watermark strength step 205 is described. In order to decide the strength of the visual watermark that has the best visual appeal, a simple model is created based on the response of a sample of human subjects. A sample pool of N human subjects is each presented with the original image watermarked at different strengths, i.e. a reference image which has a watermark strength with different values of ΔL*. Each subject is asked to select the watermark strength which is appropriate; for example, if the watermark of the image is neither "too light" nor "too dark." Let S be a statistical average of the different watermark strengths selected by the subjects for a given image. As is known, increasing the number of human subjects within the sample pool provides a more "accurate" statistical value for S.

In addition, since the object of studying a human sample space is to determine an appropriate perceived watermark strength, a model is created for the statistical measure S relating values for some mathematical measure, or measures, for each image presented. Therefore, the sample pool may be presented with a number of different images to determine the statistical value for S. Consequently, the responses of each subject is recorded for each original image over a set of several original images. For convenience, a "reference image" is a term used to refer to the image or the group of images which are presented to the human sample pool, and a "reference watermark strength" is the statistical average of the different watermark strengths selected by the subjects for the reference image.

For example, a linear regression model may then be developed relating S to the measured texture values of the image. For simplicity, assume one texture value $x_1$ has been measured for the reference image before watermarking. The reference watermark strength, S, may be expressed as a function of $x_1$. For example, a simple model is a linear model, given in equation (12):

$$S = ax_1 + b \quad (12)$$

With the different watermark strengths selected by the subjects from the sample pool for the reference image and $x_1$ (the measured texture value for the reference image), the statistical value for S (mean subjective watermark strength) is determined using established methods, and the set of parameter values for a and b in the above equation (12) may be estimated, for example, by using the method of least squares.

Once a and b is obtained from a sample pool using a group of watermarked images, the model is tested to ascertain that the model provides a good fit to the data, or the linear model is actually valid. Then the texture measure $x_1$ is used to predict the mean subjective watermark strength S. The predicted value is typically denoted by the $\hat{S}$. In other words, the model captures the essence of subjective human assessments in this manner, and can automatically determine what strength $\hat{S}$ appears pleasing to the average human subject. This model and corresponding sets of parameter coefficients are then provided to the processor and stored in parameter database of watermark strength 105 (FIG. 1.).

The above linear model may be extended to two different texture measures as follows in equation (13):

$$S = ax_1 + bx_2 + c \quad (13)$$

In equation 13, $x_1$ and $x_2$ are two different measured texture values, or measures of texture, and the set of parameter coefficients of the measured texture values, a, b, and c, may again be determined through least squares. Determination of the set of parameter coefficients is again performed once over the set of all watermarked images and subjects used of the sample pool. Subsequently, the same set of parameter coefficients are used over any input image. For example, $x_1$ may be the measured image mean and $x_2$ the image variance. As would be readily apparent to one skilled in the art, the extension to M different texture measures may be done in a similar fashion. However, the present invention is not restricted by the choice of the precise texture measure, the number of texture measures, or the type of model used. Also, for the described exemplary embodiment, the procedure is illustrated by means of a linear model, but non-linear models may also be used.

Finally, at step 206 of FIG. 2, the process of adjusting watermark strength using the model for watermark strength of step 205 is as follows. The image texture can either be measured in step 203 globally (across the whole image), or locally over an N×N window which slides over the image. The estimate of $\tilde{S}$ will apply over all pixels in the window in which the texture is measured. Thus, if the whole image is used to measure texture, only one value of $\tilde{S}$ is calculated which determines the value of $\Delta L^*$ to be applied to the image. In a preferred embodiment, $\Delta L^* = \tilde{S}$, this value of $\Delta L^*$ is then used to adjust all the pixels in the image.

The new brightness $\tilde{Y}$ is then calculated in equation (14), which is performed in a similar manner to the process described before with respect to equation (5):

$$\tilde{Y} = \begin{cases} Y + \dfrac{Y_\omega}{38.667}\left(\dfrac{Y}{Y_w}\right)^{2/3} \Delta L^* & \text{if } (Y/Y_\omega) \geq 0.008856 \\ Y + \dfrac{Y_\omega}{903.3} \Delta L^* & \text{otherwise} \end{cases} \quad (14)$$

As before, the other tristimulus components, $\tilde{X}$ and $\tilde{Z}$, may be obtained by scaling the values by the ratio of $\tilde{Y}/Y$. The new tristimulus values may be transformed back to (R,G,B) values of the RGB color space using the inverse of equation (1) in equation (15), in a similar manner to the process described before with respect to equation (6):

$$\begin{bmatrix} R \\ G \\ B \end{bmatrix} = M_s^{-1} \begin{bmatrix} \tilde{X} \\ \tilde{Y} \\ \tilde{Z} \end{bmatrix} \quad (15)$$

where $M_s^{-1}$ is the inverse of matrix $M_s$. These values of (R,G,B) are then stored by line, or column, as the watermarked image in the step 208.

In an alternative embodiment of the present invention, several linear models are stored, with corresponding sets of parameter coefficients. The computing unit 102 of FIG. 1 includes a resident program which compares the image to a representative reference image for several reference image categories. If the image is "close" by a predefined image measure to one representative reference image, the models and sets of parameters associated with that representative reference image are used to adjust image watermark strength. In a further embodiment, the multiple reference image sub-categories are used which are related to the type of image watermark used.

Invisible Watermarking and Adjustment of Watermark Strength

As is known in the art, a method of invisible watermarking embeds the watermark in the DCT coefficients of the image. In accordance with the exemplary techniques of the present invention previously described for adjusting the strength of a visual watermark, an alternative embodiment of the present invention alters selected DCT coefficients values as a function of the measured texture values. For example, the DCT coefficients may be altered to a larger degree for an image with higher texture content as the watermark would be hidden better in the textural variations. Conversely, the DCT coefficients are only slightly altered for an image with lesser textural content.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method of determining a watermark strength of a watermarked image, the watermarked image formed from an image and a watermark, the watermark strength corresponding to a reference watermark strength of a reference image and the reference image having a set of parameters associated with a measured texture value of the reference image, the method comprising the steps of:
   a) changing the reference watermark strength until a human observer indicates that the watermark is visible;
   b) measuring a texture value of at least a portion of the image; and
   c) calculating the watermark strength for the watermarked image based on the measured texture value of the image and the set of parameters of the reference image.

2. The method of determining the watermark strength for a watermarked image as recited in claim 1, wherein the reference image is one of a set of original images, the reference watermark strength is determined from a plurality of appropriate watermark strengths for each of the plurality of original images, and the set of parameters are further associated with at least one measured texture value of each of the plurality of original images.

3. The method of determining the watermark strength for a watermarked image as recited in claim 2, wherein the set of parameters comprises a set of coefficients of a model, the set of coefficients in combination with the measured texture value of each of the plurality of original images providing the reference watermark strength.

4. The method of determining the watermark strength for a watermarked image as recited in claim 1, further comprising the step of c) adjusting a current strength of at least one selected portion of the watermark so as to provide the calculated watermark strength for the watermarked image.

5. The method of determining the watermark strength for a watermarked image as recited in claim 1, wherein the set of parameters is determined by (i) setting the reference watermark strength as a linear combination of at least one measured texture value of the reference image and the set of parameters, and (ii) determining each parameter value of the set of parameters using an estimation measure.

6. The method of determining the watermark strength for a watermarked image as recited in claim 5, wherein the step of measuring at least one texture value measures at least one of image inertia, image energy, image homogeneity, and image entropy for the watermarked image using a co-occurance matrix.

7. The method of determining the watermark strength for a watermarked image as recited in claim 5, wherein the step of measuring a texture value measures a local image energy of at least a portion of the image using at least one energy mask.

8. The method of determining the watermark strength for a watermarked image as recited in claim 4, wherein the image includes a plurality of image pixel values each having a corresponding pixel strength, the watermark includes a plurality of watermark pixel values each having a corresponding watermark pixel strength, the watermarked image is a combination of the plurality of image pixels with the plurality of watermark pixel values, and the adjusting step adjusts the watermark pixel strength of selected ones of the plurality of watermark pixel values combined with corresponding ones of the plurality of image pixel values so as to provide the calculated watermark strength of the watermarked image.

9. The method of determining the watermark strength for a watermarked image as recited in claim 4, wherein the image includes a plurality of frequency-domain transformed image coefficient values, the watermark includes a plurality of watermark values, the watermarked image is a combination of the plurality of frequency-domain transformed image coefficient values with the plurality of watermark values, and the adjusting step adjusts selected ones of the plurality of watermark values so as to provide the calculated watermark strength of the watermarked image.

10. An apparatus for setting a watermark strength of a watermark within a watermarked image, the watermarked image formed from an image and the watermark, the watermark strength corresponding to a reference watermark strength of a reference image and having a set of parameters associated with a measured texture value of the reference image, comprising:
   receiving means for receiving from at least one human subject, an indication that the watermark is visible in said reference image which corresponds to said image;
   measuring means for measuring a texture value of at least a portion of the image;
   calculating means for calculating the watermark strength for the watermarked image based on the measured texture value of the image and the set of parameters of the reference image; and
   adjusting means for adjusting a current strength of at least one portion of the watermarked image so as to provide the strength level for the watermarked image.

11. The apparatus for setting the watermark strength as recited in claim 10, wherein the set of parameters associated with the measured texture value of the reference image is determined by (i) setting the reference watermark strength as a linear combination of at least one measured texture value of the reference image and the set of parameters, and (ii) determining each parameter value of the set of parameters using an estimation measure.

12. The apparatus for setting the watermark strength as recited in claim 11, wherein the measuring means measures at least one texture value corresponding to at least one of image inertia, image energy, image homogeneity, and image entropy using a co-occurance matrix and local image energy using at least one energy mask.

13. The apparatus for setting the watermark strength as recited in claim 11, wherein the image includes a plurality of image pixel values each having a corresponding pixel strength, the watermark includes a plurality of watermark pixel values each having a corresponding watermark pixel strength, and the adjusting means adjusts the watermark pixel strength of selected ones of the plurality of watermark pixel values combined with corresponding ones of the plurality of image pixel values so as to provide the calculated watermark strength.

14. Apparatus for watermarking a plurality of images, each watermarked one of the plurality of images having a watermark strength, the apparatus comprising:
   receiving means for receiving from at least one human subject, an indication that the watermark is visible in a reference image which corresponds to said image;
   storage means for storing a plurality of watermarks and for storing a plurality of sets of parameters, each of the sets of parameters associated with at least one measured texture value of said reference image; and
   processing means for processing a received one of the plurality of images with a selected one of the plurality of watermarks, the processing means including:
      measuring means for measuring at least one texture value of at least a portion of the received one of the plurality of images;
      selecting means for selecting one set of the plurality of sets of parameters based on the selected one of the plurality of watermarks and the received one of the plurality of images;
      calculating means for calculating the watermark strength based on the at least one measured texture value and the selected set of the plurality of sets of parameters;
      watermarking means for applying the selected one of the plurality of watermarks to the received one of the plurality of images to obtain a watermarked image having a current strength; and
      adjusting means for adjusting the current strength level of the watermarked image to the calculated watermark strength to provide the one watermarked image.

15. The apparatus for applying a watermark to an image as recited in claim 14, wherein each set of parameters associated with at least one measured texture value of a corresponding reference image is determined by (i) setting the reference watermark strength as a linear combination of at least one measured texture value of the reference image and the corresponding set of parameters, and (ii) determining each parameter value of the set of parameters using an estimation measure.

16. A method of determining a watermark strength of a watermarked source image, the watermarked source image formed from a source image and a watermark, the watermark strength based on the source image and a reference watermark strength of a reference image and the reference image having a set of parameters associated with a measured texture value of the reference image, the method comprising the steps of:
   a) selecting an image for use as a reference image;
   b) determining the reference watermark strength by adjusting the strength of the watermark applied to said reference image until a human observer indicates that the watermark has been seen;
   c) measuring the texture of said reference image; and developing a set of parameters of the reference image that describe the texture for said reference image;
   d) measuring a texture value of at least a portion of the source image; and
   e) calculating the watermark strength for the watermarked image based on the measured texture value of the source image, the reference watermark strength, and the set of parameters of the reference image.

17. A method of determining a watermark strength of a watermarked source image, the watermarked source image formed from a source image and a watermark, the watermark strength based on the source image and a reference watermark strength of a reference image and a set of parameters associated with a measured texture value of said reference image, the method comprising the steps of:

a) selecting a set of prototype images;

b) for each of the prototype images; determining a just-visible watermark strength by adjusting the strength of the watermark applied to said prototype image until a human observer indicates that the watermark has been seen; and measuring the texture of said prototype image and developing a set of parameters that describe the texture for said prototype image;

c) selecting one of the prototype images as a reference image wherein the reference watermark strength is the just-visible strength of the selected prototype image and the set of reference parameters is the set of parameters describing the texture of said selected prototype image;

d) measuring a texture value of at least a portion of the source image; and e) calculating the watermark strength for the watermarked image based on the measured texture value of the source image, the reference watermark strength, and the set of parameters of the reference image.

\* \* \* \* \*